United States Patent [19]

Hailey

[11] Patent Number: 4,683,728
[45] Date of Patent: Aug. 4, 1987

[54] LOCKING DEVICE
[75] Inventor: Michael L. Hailey, Joplin, Mo.
[73] Assignee: Transportation Specialties, Inc., Joplin, Mo.
[21] Appl. No.: 867,153
[22] Filed: May 27, 1986
[51] Int. Cl.$^4$ .......................... B66F 3/00; E05B 73/00
[52] U.S. Cl. .......................................... 70/14; 70/18; 70/181; 70/192; 70/203
[58] Field of Search ................ 70/14, 18, 55, 76, 181, 70/182, 192, 212, 203

[56] References Cited

U.S. PATENT DOCUMENTS

| | | | |
|---|---|---|---|
| 578,629 | 3/1897 | Dowd | 70/182 |
| 1,106,154 | 8/1914 | Nash | 70/203 |
| 1,236,913 | 8/1917 | Coté | 70/182 |
| 1,266,391 | 5/1918 | Bonney . | |
| 1,549,638 | 8/1925 | Wallace | 70/14 |
| 1,588,421 | 5/1926 | Holland | 70/212 |
| 2,564,821 | 8/1951 | Smith . | |
| 3,071,348 | 1/1963 | Huber . | |
| 3,271,007 | 9/1963 | Ratcliff . | |
| 3,418,008 | 12/1968 | Durbin . | |
| 3,710,606 | 1/1973 | Prince | 70/203 |
| 3,789,464 | 2/1974 | Callanus . | |
| 3,914,965 | 10/1975 | Paxton . | |
| 3,939,677 | 2/1976 | Drayton . | |
| 3,954,252 | 5/1976 | Lyons . | |
| 3,974,668 | 8/1976 | McWhorter . | |
| 4,062,206 | 12/1977 | McWhorter . | |
| 4,107,958 | 8/1978 | Manley, Jr. . | |
| 4,238,940 | 12/1980 | McWhorter . | |
| 4,238,948 | 12/1980 | Rase . | |

FOREIGN PATENT DOCUMENTS 521946 7/1921 France ................................ 70/212

Primary Examiner—Henry E. Raduazo
Attorney, Agent, or Firm—Litman, Day & McMahon

[57] ABSTRACT

A locking device is provided which includes a body comprising a tube with a bore and a longitudinally-extending flange with a plurality of shackle receivers. The bore is adapted to slideably receive an elongate member, such as a load binder handle. The body is secured to a second member, for example a load binder connector or a load chain link, by a padlock including a case and a shackle receivable in a respective shackle receiver. With the padlock in its locked position, the elongate member and the second member are secured together.

3 Claims, 4 Drawing Figures

U.S. Patent  Aug. 4, 1987  4,683,728
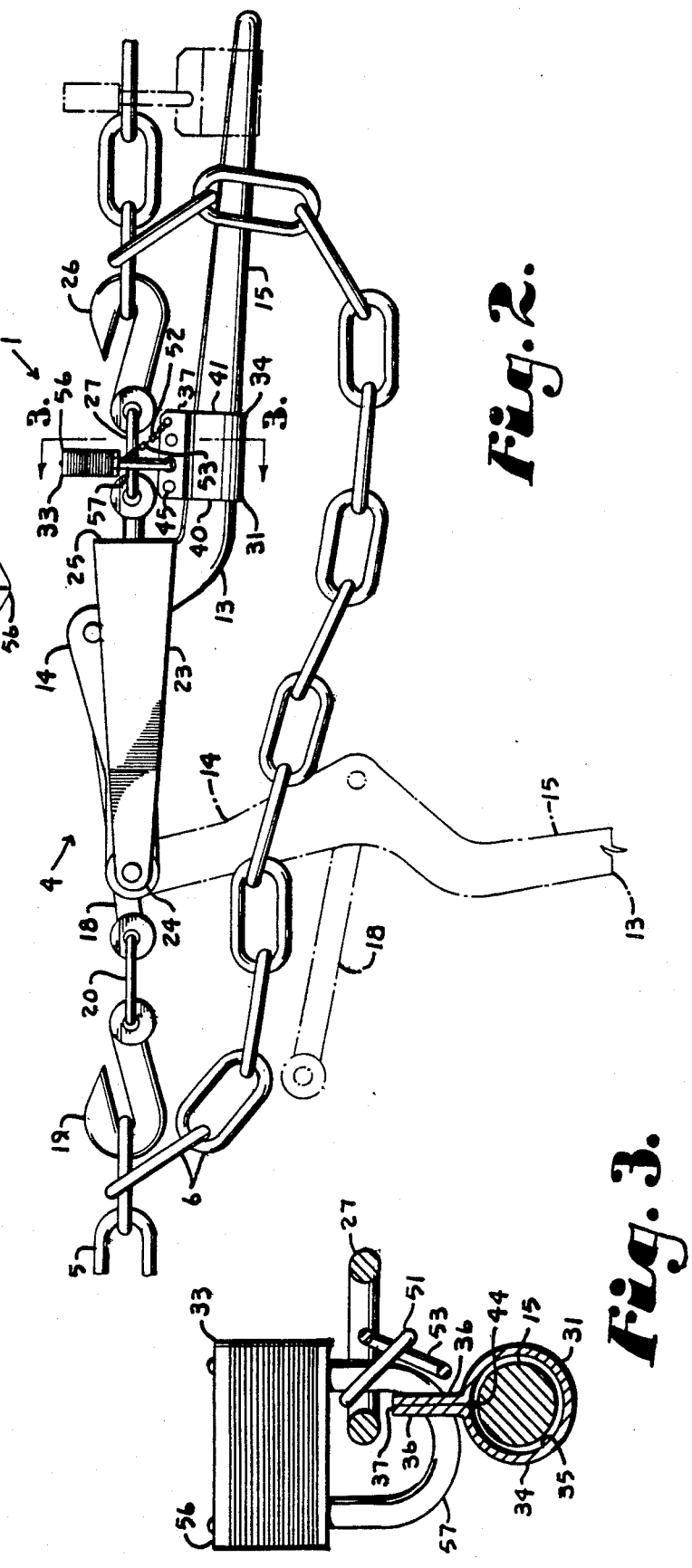

LOCKING DEVICE

BACKGROUND OF THE INVENTION

1. Field of the Invention

The present invention relates generally to locking devices and in particular to a safety and security device for a load binder.

2. Description of the Prior Art

Locking devices are well-known in the prior art and a variety of different types have been devised for securing various items that require locking for security and safety reasons.

For example, load binders of the type used for tightening tensile members may benefit from a locking device such as the present invention. Such load binders are extensively used in the trucking industry for securing certain types of loads on flatbed semi-trailers and truck beds. They are generally used in conjunction with tension members such as chains, cables and straps which are placed over or secured to loads. For example, a load of logs or utility poles stacked lengthwise on a flatbed semi-trailer or truck bed may be secured with several chains attached at their respective ends to the trailer and placed over the load at spaced intervals. Load binders may then be employed for placing the chains in tension.

A common type of load binder comprises three pivotally interconnected sections and employs an over-center locking principle. Examples of this type of load binder are shown in the Smith U.S. Pat. No. 2,564,821; the Ratcliff U.S. Pat. No. 3,271,007; the Durbin U.S. Pat. No. 3,418,008; the Lyons U.S. Pat. No. 3,954,252; and the McWhorter U.S. Pat. Nos. 4,062,206 and 4,238,940. Several of the aforementioned patents show locking devices for holding the respective binder handles in their closed and locked positions. For example, the Smith U.S. Pat. No. 2,564,821 discloses a cotter key, the Lyons U.S. Pat. No. 3,954,252 shows a padlock and the McWhorter U.S. Pat. No. 4,238,940 teaches the use of a keyed cylinder lock for securing the respective binder handles in their closed and locked positions.

However, a substantial percentage of the load binders presently in use in the trucking industry do not have such locking devices. These unlocked load binders pose threats to the security of the load and to the safety of all persons near them. Load binders which cannot be locked in place render the loads that they are securing susceptible to theft and may themselves be stolen. Furthermore, the handles are typically held in place by an over-center arrangement, but can sometimes be released accidentally, for example by a sudden slackening of the tension member which allows the handle to fly open, with the possibility of causing injury either from th sudden release of the handle under great force or the release of the load itself.

The locking device of the present invention is particularly designed for use with load binders that are not equipped with other locking mechanisms. Heretofore there has not been available a locking device with the advantages and features of the present invention.

SUMMARY OF THE INVENTION

In the practice of the present invention, a locking device is provided which includes a body having a cylindrical tube with a bore extending longitudinally therethrough between opposite ends of the body. A flange comprising a pair of flange halves extends longitudinally with respect to the body between its ends and includes a plurality of transversely-extending receivers. The tube bore is adapted to slideably receive an elongate member, such as the handle of a load binder. With the body thus mounted on the elongate member, it may be connected to a second member, such as a load binder connector or a load chain link, by a padlock. The padlock has a shackle received in a respective shackle receiver and a case. The padlock is connected to the flange by a tether chain.

The objects of the present invention are: to provide a locking device; to devise such a device which is particularly adapted for securing a load binder in its closed position; to provide such a locking device which is adapted for use with existing load binders; to provide such a locking device which includes a padlock; to provide such a locking device which is capable of withstanding substantial tensile forces; to provide such a locking device which reduces the risk of personal injury and property damage from load binders; to provide such a locking device which contributes to the security of a load, a load chain and a load binder, and to provide such a locking device which is economical to manufacture, efficient in operation, capable of a long operating life and particularly well adapted for the proposed usage thereof.

DESCRIPTION OF THE DRAWINGS

FIG. 1 is a fragmentary perspective view of a semi-trailer with a load binder secured by a locking device embodying the present invention.

FIG. 2 is a side elevational view of the load binder and the locking device with an open position of the load binder handle shown in phantom.

FIG. 3 is a vertical, cross-sectional view of the load binder and the locking device taken generally along line 3—3 in FIG. 2.

FIG. 4 is a perspective view of the locking device.

DETAILED DESCRIPTION OF THE PREFERRED EMBODIMENTS

As required, detailed embodiments of the present invention are disclosed herein, however, it is to be understood the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference number 1 generally designates a locking device embodying the present invention. The locking device 1 is shown securing a load binder 4 in its locked position whereby a tensile force is exerted on a load chain 5 comprising interconnected links 6. As shown in FIG. 1, the load chain 5 is placed over a load comprising, for example, logs 9 on a flatbed semi-trailer 10.

The load binder 4 includes a lever 13 comprising a bifurcated clevis section 14 and a handle section 15. A draw bar 18 is pivotally connected to the lever 13 in proximity to the intersection of the clevis and handle sections thereof and is connected to a proximate hook 19 by a proximate hook connector 20. The draw bar 18 is journaled in the lever clevis section 14.

A hook clevis 23 includes a proximate end 24 pivotally connected to the lever clevis section 14. A distal end 25 of the hook clevis 23 is connected to a distal hook 26 by a distal hook connector 27.

The load binder 4 described thus far is of conventional design. In operation the hooks 19, 26 are placed in respective chain links 6 with the lever 13 in its open position as shown in dashed lines in FIG. 2. The lever 13 is then rotated in a counter-clockwise direction as oriented in FIG. 2 to its closed position whereat the pivotal connections between the lever 13, the draw bar 18 and the hook clevis 23 are above (or "over-center" with respect to) the centerline of thrust between the hooks 19, 26. The distance between the hooks 19, 26 is shortened by rotating the lever 13 counter-clockwise from its open position to its closed position whereby the load chain 5 is placed in tension.

The tensile force in the load chain 5 is transmitted through the load binder 4 and functions to maintain the lever 13 in its closed position, provided the pivotal connections of the lever 13 are over-center with respect to the thrust centerline. The lever 13 is prevented from rotating further in a counter-clockwise direction by an abutment with the hook clevis 23. With the lever 13 in its closed position, the draw bar 18 is positioned within the lever clevis section 14 and the lever clevis section 14 is located partly within the hook clevis 23.

It is generally preferred that the load binder 4 remain closed until an operator rotates the lever 13 in a clockwise direction to release the tension in the load chain 5, for example in preparation for unloading the logs 9. However, in over-the-road travel semi-trailers such as that shown at 10 and the loads thereon are subjected to various forces and may shift dangerously if not securely retained. If such forces slacken the chain 5, the load binder 4 may release unless restrained by the locking device 1.

The locking device 1 generally comprises a body 31 and linking means comprising a padlock 33. The body 31 includes a cylindrical tube 34 and a flange 37 intergrally formed from flat metal stock which is stamped and bent to form a longitudinally-extending tube bore 35 and flange halves 36 which are placed in juxtaposed, abutting relation to form the flange 37. The flange 37 extends longitudinally between proximate and distal ends 40, 41 of the body 31. The flange halves 36 are preferably secured together by weldments 44 extending from each end 40, 41 and located inside the bore 35 at the intersection of the flange halves 36.

The flange halves 36 include matching sets of receivers 45, e.g. three each in the preferred embodiment, which are aligned when the flange halves 36 are welded together to form the flange 37. The receivers 45 are longitudinally aligned along the flange 37 and extend tranversely with respect to the body 31. A tether fastener receiver (not shown) extends transversely through the flange halves 36 in proximity to the body distal end 41. A tether fastener 50, e.g. a rivet, is received in the tether fastener receiver and mounts a tether chain 52 with links 53. The padlock 33 includes a case 56 and a shackle 57 received in one of the tether chain links 53.

Without limitation on the generality of useful materials, the body 31 may be formed of ten gauge steel, either stainless or cold rolled. Alternatively, the body 31 may be cast.

In operation, the tube bore 35 slideably receives the lever handle section 15. As shown in FIG. 2, the body 31 may be placed adjacent to either the distal hook connector 27 or one of the load chain links 6 adjacent to the distal hook 26, the latter location being shown in the phantom. The padlock shackle 57 is placed through a suitable flange shackle receiver 45 and either the distal hook connector 27 or a load chain link 6.

In operation, the padlock 33 is normally not subjected to tension. However, the locked padlock 33 will limit the rotation of the lever 13 in a clockwise direction toward its open position. Thus, if the load chain 5 slackens because of a shifting of the load and the lever 13 is dislodged from its locked position, the locking device 1 will restrict rotation of the lever 13 to thereby prevent personal injury or property damage that might otherwise result.

Furthermore, the locking device 1 functions as a security device to deter the theft of the load, the load chain 5 and the load binder 4. For additional security, locking devices 1 embodying the present invention can be employed in both of the locations shown in FIG. 2. Furthermore, the padlocks 33 of a pair of locking devices 1 thus employed may be keyed differently whereby more than one key would be required to open the load binder 4. With this arrangement, access to the load can require more than one person in situations where, for example, extra security precautions are required for a particular cargo.

In place of the padlock 33, the linking means may comprise various other devices including nylon ties, etc.

It is to be understood that while one form of this invention has been illustrated and described, it is not to be limited to the specific form or arrangement of parts herein described and shown, except insofar as such limitations are included in the following claims.

What is claimed and desired to be secured by Letters Patent is as follows:

1. In combination with a load chain including a plurality of links and a load binder including a lever with clevis and handle sections, a drawbar pivotably connected to the lever clevis section and connected to a proximate hook, a hook clevis pivotably connected to the lever clevis section at a proximate end thereof and connected to a distal hook by a distal hook connector link at a distal end thereof, said lever handle section being positioned in proximity to said hook clevis distal end and each said hook receiving a respective chain link with said load binder in a closed position, the improvement of a locking device, which comprises:
   (a) a body integrally formed from flat sheet stock and including:
      (1) a proximate end;
      (2) a distal end;
      (3) a cylindrical tube with a bore extending therethrough between said body ends and receiving said lever handle section; and
      (4) a pair of flange halves welded together from inside said bore in juxtaposed relation to form a longitudinally-extending flange, said flange having a plurality of transversely-extending shackle receivers and a transversely-extending tether chain fastener receiver;
   (b) a padlock including a shackle extending through a respective shackle receiver and extending through one of said distal hook connector link and a respective load chain link whereby said load binder is secured in its closed position;

(c) a tether chain attached to said flange and including a first link adapted to receive said padlock shackle and a second link; and (d) a tether chain fastener extending through said tether chain fastener receiver and said tether chain second link.

2. The combination according to claim 1 wherein:
(a) said body comprises cold rolled steel.

3. The combination according to claim 1 wherein:
(a) said body comprises stainless steel.

* * * * *